United States Patent
Liu et al.

(10) Patent No.: US 7,345,732 B2
(45) Date of Patent: Mar. 18, 2008

(54) LIQUID CRYSTAL DISPLAY PANEL AND MANUFACTURING METHOD THEREOF

(75) Inventors: Meng-Chi Liu, Taoyuan County (TW); Hsiao-Fen Chen, Taipei County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 134 days.

(21) Appl. No.: 10/711,627

(22) Filed: Sep. 29, 2004

(65) Prior Publication Data

US 2006/0066801 A1     Mar. 30, 2006

(51) Int. Cl.
*G02F 1/1339*     (2006.01)
(52) U.S. Cl. ...................... 349/156; 349/155
(58) Field of Classification Search ......... 349/155–156
See application file for complete search history.

(56) References Cited

U.S. PATENT DOCUMENTS 6,774,975 B2 *   8/2004   Ahn ........................... 349/156

FOREIGN PATENT DOCUMENTS

JP     2002214624     7/2002

* cited by examiner

*Primary Examiner*—Dung T. Nguyen
(74) *Attorney, Agent, or Firm*—Jianq Chyun IP Office

(57) ABSTRACT

A liquid crystal display panel and a manufacturing method thereof. The liquid crystal display panel comprises a color filter substrate and a thin film transistor array substrate arranged in parallel and a liquid crystal layer between the substrates. In addition, several spacers are disposed on a black matrix of the color filter substrate. These spacers lean on the edge of at least one of the gate layer lines and source layer lines on the thin film transistor array substrate. The invention increases the bonding stability between the color filter substrate and the thin film transistor array substrate so that the reliability and display quality of the liquid crystal display panel is improved.

12 Claims, 8 Drawing Sheets

LIQUID CRYSTAL DISPLAY PANEL AND MANUFACTURING METHOD THEREOF

BACKGROUND OF THE INVENTION

1. Field of the Invention

The present invention relates to a display panel and manufacturing method thereof. More particularly, the present invention relates to a high reliability liquid crystal display panel and manufacturing method thereof.

2. Description of Related Art

With the rapid development of multi-media systems, image data is mostly transmitted in a digital format through a network rather than in an analogue format through a cable. To match the life style of modern people, lighter and compact video or image display devices are also being designed. Although the conventional cathode ray tube (CRT) has high display quality and relatively low production cost, the electron gun inside the CRT not only produces hazardous radiation but also renders it bulky.

With recent advance in opto-electronic fabricating techniques and the maturity of semiconductor manufacturing processes, the development of flat panel display devices has to proceed quite rapidly. In particular, liquid crystal displays (LCD) have gradually replaced the conventional CRT and have become the mainstream display product due to its low operating voltage, radiation-free illumination, lightness and small volume occupancy.

A liquid crystal display (LCD) mainly comprises a liquid crystal display panel and a back light module. The liquid crystal display panel further comprises a color filter substrate, an active device array substrate and a liquid crystal layer sandwiched between the two substrates. The back light module provides a surface light source necessary for the liquid crystal display panel for displaying images. To maintain a fixed distance of separation between the color filter substrate and the active device array substrate after assembling the liquid crystal display panel, a plurality of spacers are often disposed between the color filter substrate and the active device array substrate.

FIG. 1 is a schematic cross-sectional view of the structure of a conventional liquid crystal display panel. As shown in FIG. 1, the liquid crystal display panel 100 mainly comprises a color filter substrate 110, a thin film transistor array substrate 120, a liquid crystal layer 130, a sealant 140 and a plurality of spacers 150. The sealant 140 is located on the periphery of the color filter substrate 100 and the thin film transistor array substrate 120 and connected the color filter substrate 100 and the thin film transistor array substrate 120 together. The liquid crystal layer 130 completely fills the space bounded by the color filter substrate 110, the thin film transistor array substrate 120 and the sealant 140. In addition, the spacers 150 are ball spacers disposed between the color filter substrate 110 and the thin film transistor array substrate 120 so that the two substrates are set at a fixed distance apart. However, these ball spacers 150 within the liquid crystal display panel tend to gather in one place when the liquid crystal display panel is shake. Therefore, the twisting of the liquid crystal molecules near the collection of ball spacers 150 is reduced in the presence of an electric field in the usual manner leading to the so-called 'spacer leakage'.

To reduce the aforementioned problem, a spacer on color filter (SOC) technique has been developed. In this technique, a plurality of spacers made from an organic photosensitive material is formed on the black matrix of a color filter substrate. Therefore, after joining the color filter substrate and the thin film transistor array substrate, the spacers will be disposed on top of the scan line, common line or data line of the thin film transistor array substrate.

It should be noted that the size and function of a liquid crystal display panel continues to expand because this is the trend. For example, liquid crystal televisions having an associated speaker or other wide display devices are quite common. Because of the weight of a large substrate and the acoustic vibration produced by the speaker, the color filter substrate and the thin film transistor array substrate may separate from each other once the sealant reaches an aging or fatigue limit or the spacers are uneven. This often leads to an abnormal display or a premature failure. Although the problem can be ameliorated by increasing the width of the sealant so that the upper and lower substrate are more firmly sealed together, the additional width in the sealant often inconveniences production (coating and hardening) and panel edge narrowing.

In view of the problems, methods of improving the reliability and increasing the size of a liquid crystal display panel are critical for expanding the market share in display products.

SUMMARY OF THE INVENTION

Accordingly, the present invention is directed to a liquid crystal display panel having a thin film transistor array substrate and a color filter substrate. Spacers are disposed inside the liquid crystal display panel lean against the edge of structures having a step height above the surface of the thin film transistor array substrate. This increases the bonding stability between the color filter substrate and the thin film transistor array substrate so that the reliability and display quality of the liquid crystal display panel is improved.

The present invention is directed to a method of fabricating a liquid crystal display panel. Through a modification of the distribution of spacers inside the liquid crystal display panel, the bonding between the color filter substrate and the thin film transistor array substrate is strengthened and aligning of the color filter substrate and the thin film transistor array substrate prior to bonding is simplified. Ultimately, the assembling rate of the liquid crystal display panel is increased and the reliability of the liquid crystal display panel is improved.

To achieve these and other advantages and in accordance with the purpose of the invention, as embodied and broadly described herein, the invention provides a liquid crystal display panel. The liquid crystal display panel comprises a color filter substrate and a thin film transistor array substrate arranged in parallel, a plurality of spacers and a liquid crystal layer. The thin film transistor array substrate comprises gate layer lines and source layer lines thereon. The spacers are disposed on the color filter substrate and lean against the edge of at least one of the gate layer lines or the source layer lines. The liquid crystal layer is disposed in the space between the color filter substrate, the thin film transistor array substrate and the spacers.

According to one embodiment of the present invention, the spacers may be disposed at the overlapping areas between the gate layer lines and the source layer lines so that spacers lean against the gate layer lines and the source layer lines at the same time. Furthermore, neighboring spacers attached to the color filter substrate are connected to form a latching structure. The latching structure has a central recess section for latching to the overlapping areas between the gate layer lines and the source layer lines.

According to one embodiment of the present invention, the spacers may be disposed at the two sides of the gate layer lines or the source layer lines so that spacers lean against the gate layer lines or the source layer lines. Furthermore, neighboring spacers attached to the color filter substrate are connected to form a latching structure. The latching structure has a central recess section for latching to the gate layer lines or the source layer lines.

According the one embodiment of the present invention, the gate layer lines are scan lines and the source layer lines are data lines, for example. According the another embodiment of the present invention, the gate layer lines are scan lines and common lines and the source layer lines are data lines, for example. In addition, the spacers have a cylindrical shape or a wall-like shape, for example.

The present invention also provides a method of fabricating a liquid crystal display panel. First, a thin film transistor array substrate is provided. The thin film transistor array substrate has a plurality of gate layer lines and a plurality of source layer lines thereon. Thereafter, a color filter substrate is provided. The color filter substrate has a plurality of spacers thereon. The thin film transistor array substrate and the color filter substrate are aligned and bonded in such a way that the spacers on the color filter substrate lean on the edge of at least one of the gate layer lines or the source layer lines on the thin film transistor array substrate.

In one embodiment of the present invention, the method of forming the color filter substrate includes the following steps. First, a glass substrate is provided. Thereafter, a black matrix is formed over the glass substrate. The black matrix encloses some areas of the glass substrate to produce a plurality of openings. Next, color filtering units are formed inside the openings. Spacers are formed on the black matrix. The spacers are formed, for example, by forming an organic photosensitive layer over the glass substrate and then patterning the organic photosensitive layer. A post-baking operation may also be performed after forming the spacers.

Accordingly, the present invention applies the SOC technique on the color filter substrate to form a plurality of cylindrical or wall-like spacers. The spacers are uniquely positioned so that the spacers lean on the edge of either the gate layer lines or the source layer lines on the thin film transistor array substrate after the liquid crystal display panel is assembled. With the spacers stiffening the interior of the liquid crystal display panel, the color filter substrate and the thin film transistor array substrate are difficult to move from its original positions to other locations due to vibration of other external forces. Hence, the reliability of the liquid crystal display panel is improved and the time required for aligning the color filter substrate and the thin film transistor array substrate is shortened. In other words, overall product yield is increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
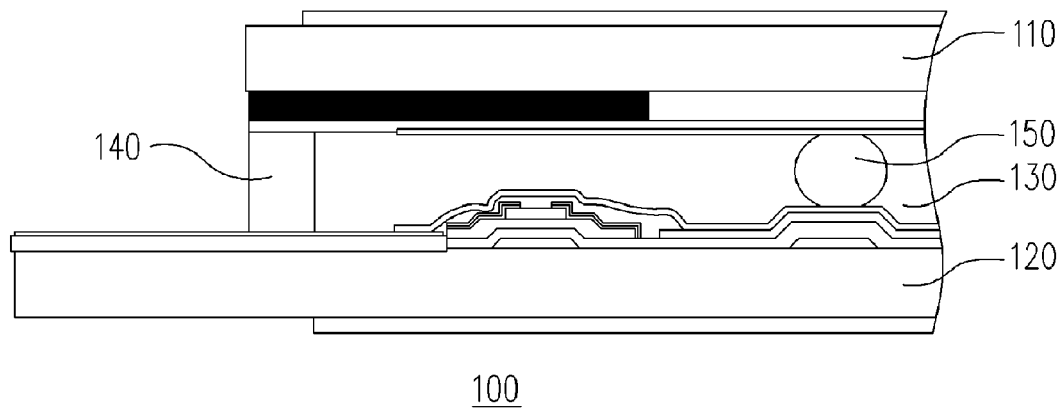
FIG. 1 is a schematic cross-sectional view of the structure of a conventional liquid crystal display panel.

Reference will now be made in detail to the present preferred embodiments of the invention, examples of which are illustrated in the accompanying drawings. Wherever possible, the same reference numbers are used in the drawings and the description to refer to the same or like parts.

Figure 2:
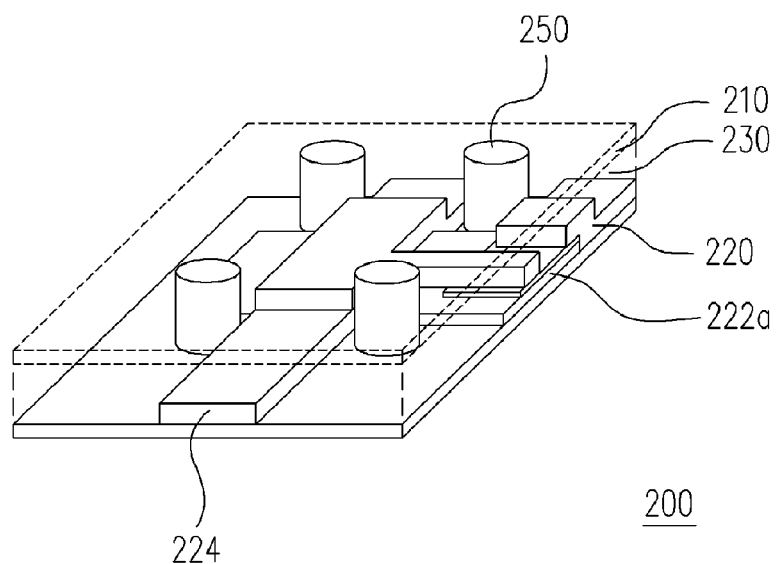
FIG. 2 is a perspective view of a section of a liquid crystal display panel according to one embodiment of the present invention.

FIG. 2 is a perspective view of a section of a liquid crystal display panel according to one embodiment of the present invention. As shown in FIG. 2, the liquid crystal display panel 200 comprises a color filter substrate 210, a thin film transistor array substrate 220, a liquid crystal layer 230 and a plurality of spacers 250. The thin film transistor array substrate 200 has a plurality of gate layer lines and a plurality of source layer lines thereon. In one embodiment, the gate layer lines include scan lines 222a, and the source layer lines include data lines 224, for example. In another preferred embodiment, the gate layer lines include scan lines 222a and common lines 224 (shown in FIG. 4), and the source layer lines include data lines 224, for example. In addition, the liquid crystal display panel 200 may further include a sealant (not shown) disposed close to the edges of the color filter substrate 210 and the thin film transistor array substrate 220. The sealant mainly serves as an intermediate element for joining the color filter substrate 210 and the thin film transistor array substrate 220 together and enclosing the liquid crystal layer 230 and the spacers 250 within the liquid crystal display panel. Since the function of the sealant and its design should be familiar to those skilled in the fabrication of liquid crystal display panel, detailed description is omitted.

As shown in FIG. 2, the spacers 250 are disposed on the color filter substrate 210 at the overlapping area between the scan line 222a and the data line 224. In fact, each spacers 250 leans against one corner of the overlapping area between the can line 222a and the data line 224. Therefore, the color filter substrate 210 is able to latch firmly to the thin film transistor array substrate 220 through the spacers 250 for higher bonding stability.

In the aforementioned embodiment, structures on the thin film transistor array structure with a step height difference is utilized so that the color filter substrate and the thin film transistor array substrate are locked in position through the spacers. Furthermore, aside from the aforementioned embodiment, a few other variations having a different number of spacers and layout on the thin film transistor array substrate are possible. Other types of layouts for the spacers are described in the following.

Figure 3:
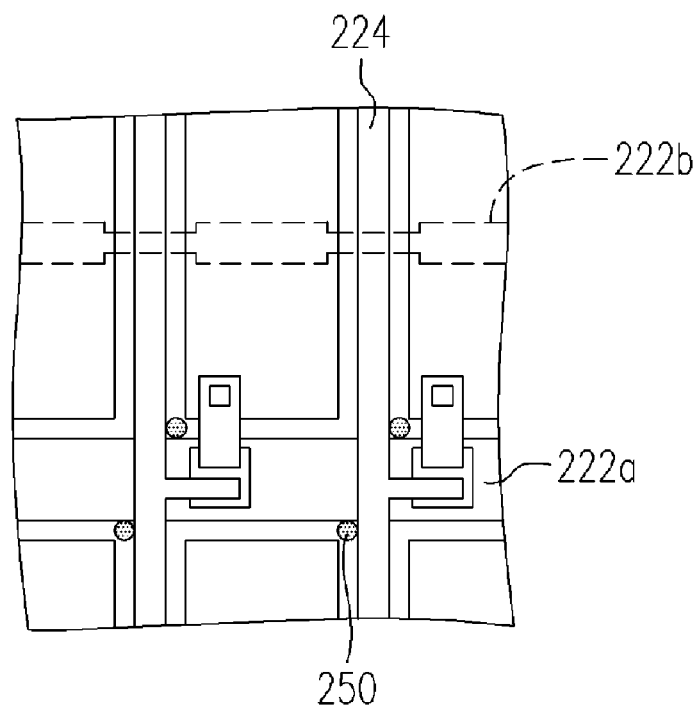
FIGS. 3~4, 5A~5C and 6A~6D are the top views of various types of layouts of spacers within a liquid crystal display panel according to one embodiment of the present invention.
Figure 4:
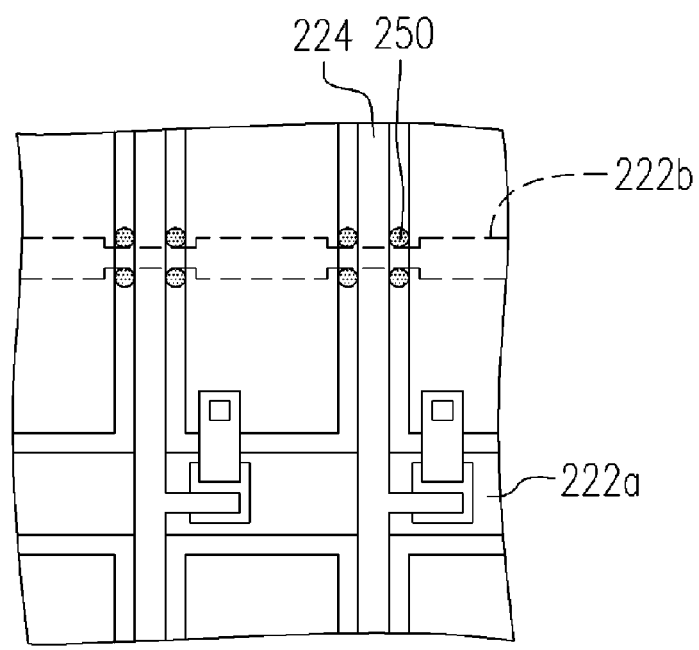
Figure 5A:
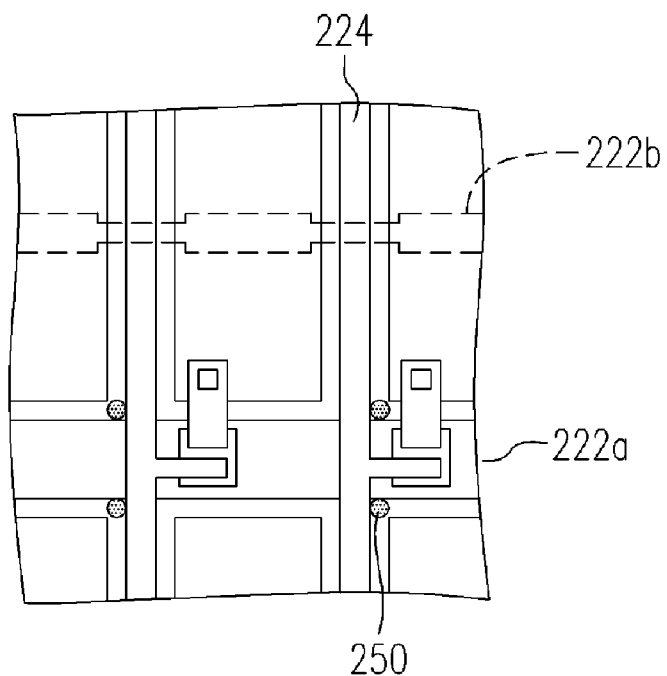
Figure 5B:
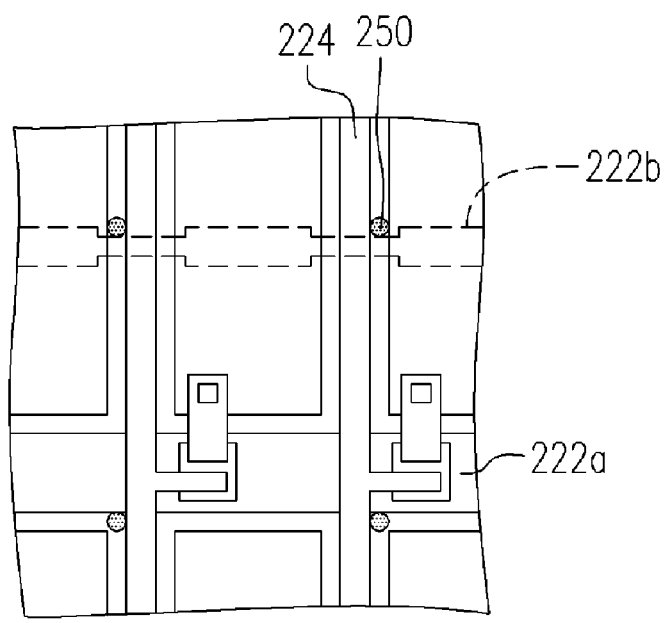
Figure 5C:
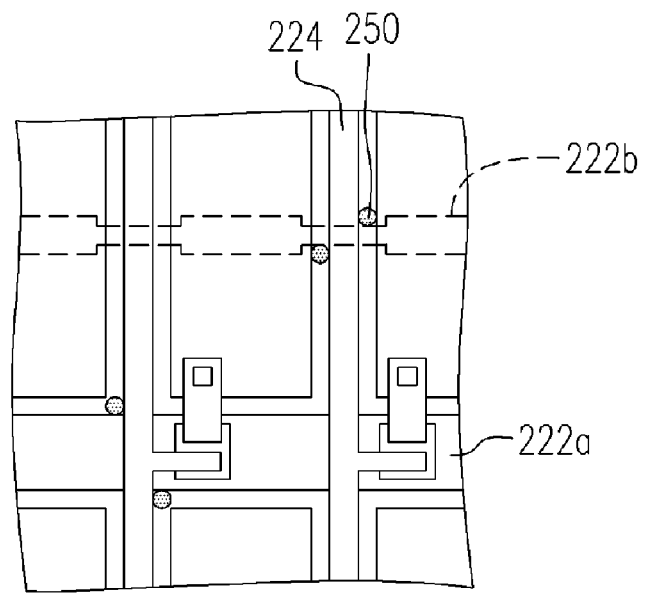
Figure 6A:
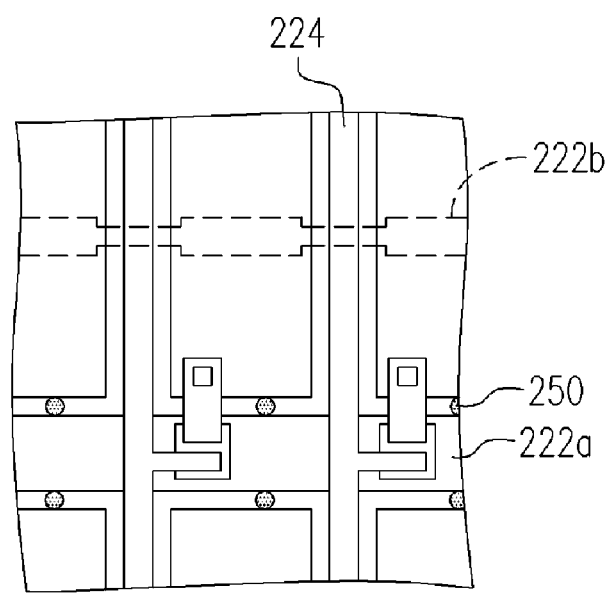
Figure 6B:
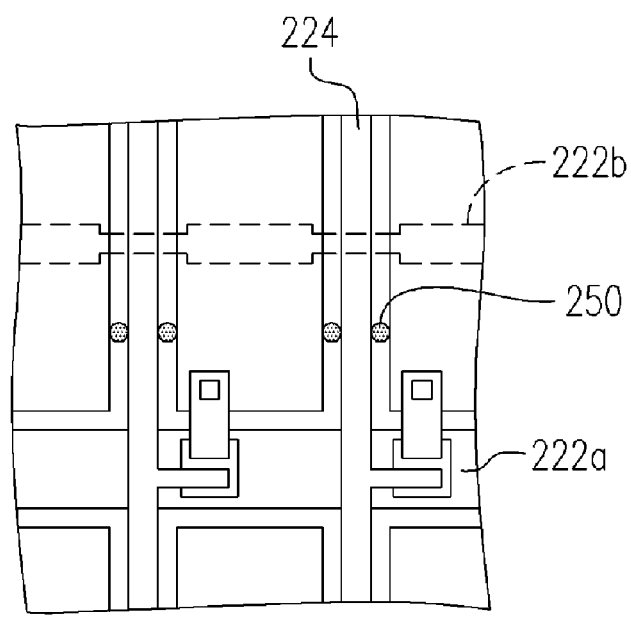
Figure 6C:
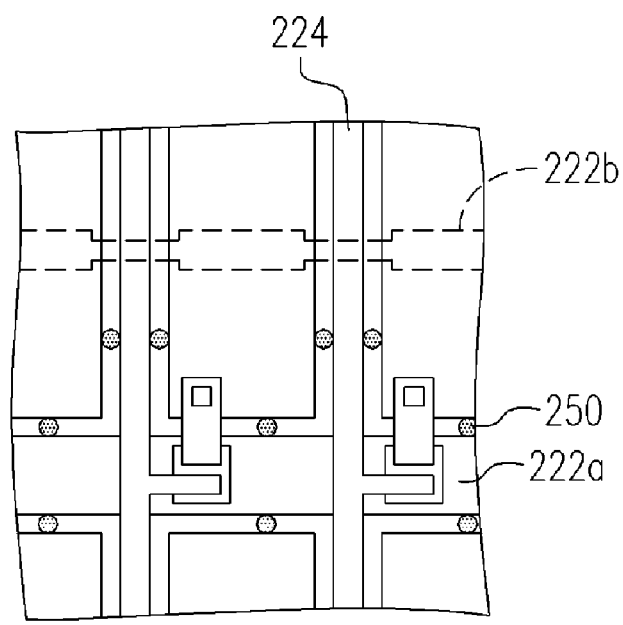
Figure 6D:
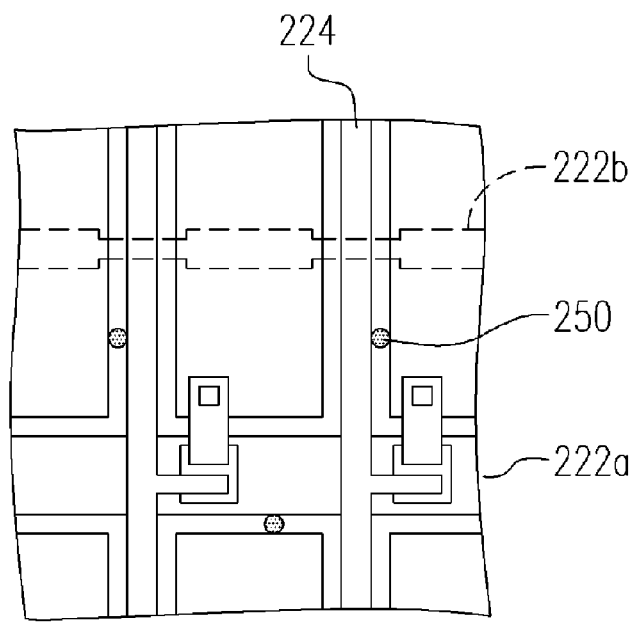

FIGS. 3 through 6 are the top views of various types of layouts of spacers within a liquid crystal display panel according to the present invention. To simplify the drawings, the color filter substrate in FIGS. 3 through 6 is not shown. First, as shown in FIG. 3, spacers 250 are positioned at diagonal corner regions of the overlapping area between a scan line 222a and a data line 224. In FIG. 4, spacers 250 are positioned at all four corner regions of the overlapping area between a common line 222b and a data line 224. Obviously, the spacers may also be positioned at the corner regions of the overlapping area between the scan line 222a and the data line 224 as well as the overlapping area between the common line 222b and the data line 224. Alternatively, the spacers may be selectively positioned at any one corner region, any pair of diagonal corner regions, adjacent corner regions or three corner regions as shown in FIGS. 5A through 5C.

FIGS. 6A through 6D are top views showing various layouts of the spacers 250 leaning against the edges of the scan lines 222a and the data lines 224. As shown in FIGS. 6A through 6D, the spacers 250 can be selectively positioned on opposite side edges or one side edge of the scan lines 222a and the data lines 224.

In the present invention, the spacers are disposed close to structures having a step height difference such as the scan lines, the common lines and the data lines on the thin film transistor array substrate so that the assembled liquid crystal display panel has higher bonding stability. However, the aforementioned embodiments serve only as examples. Anyone familiar with the technique may form a variety of designs by integrating the layouts disclosed in the present invention in various combinations to optimize the bonded display panel. For example, the spacers may be selectively positioned at the corner regions of the overlapping area between the scan lines and the data lines, between the common lines and the data lines and on each side of the scan lines and the data lines. Furthermore, the number of spacers can also be changed to reflect the processing conditions and actual demands.

Figure 7:
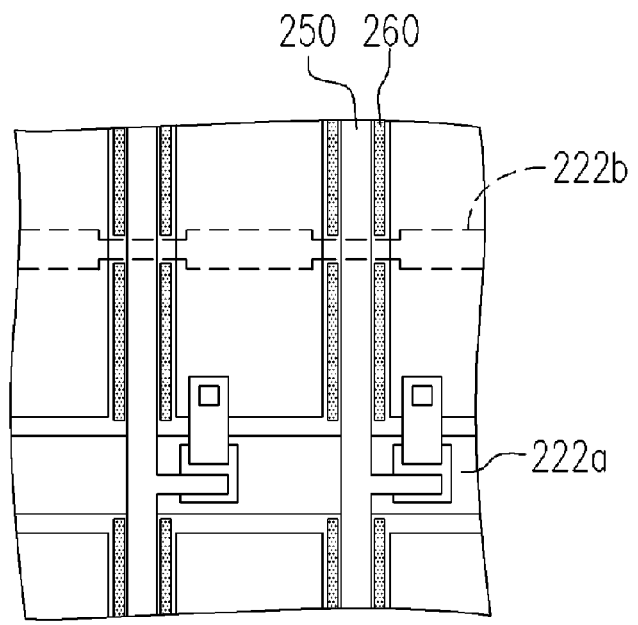
FIGS. 7 and 8 are top views showing two different layouts of wall-like spacers inside liquid crystal display panel according to the present invention.
Figure 8:
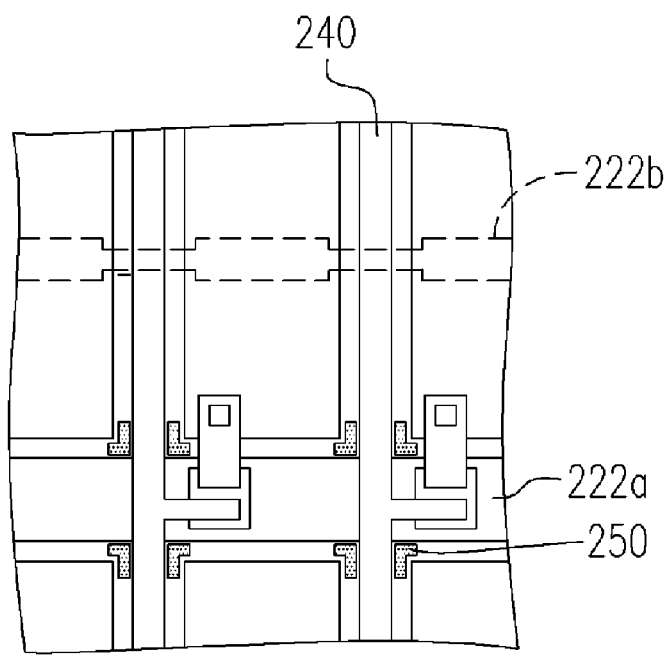

It should be noted that the spacers are not limited to a cylindrical section as in the aforementioned embodiments. In the other embodiments of the present invention, the spacers can have a polygonal section or a wall-like section. FIGS. 7 and 8 are top views showing two different layouts of wall-like spacers inside liquid crystal display panel according to the present invention. To simplify the drawings, the color filter substrate in FIGS. 7 and 8 is not shown. First, as shown in FIG. 7, the wall-like spacers 260 are disposed to lean on the two side edges of a data line 224. Through the wall-like spacers 260, the assembled liquid crystal display panel is reinforced. In FIG. 8, the wall-like spacers 260 have a right-angled section leaning against the four corner regions of the overlapping area between the scan lines 222a and the data lines 224. Obviously, in other embodiments, the wall-like spacers may also be selectively positioned at the corner regions of the overlapping area between the scan line and the data line or between the common line and the data line or on the respective sides of the scan line or the data line. Since the layouts of the wall-like spacers are similar to the cylindrical spacers, detailed description is omitted.

Figure 9:
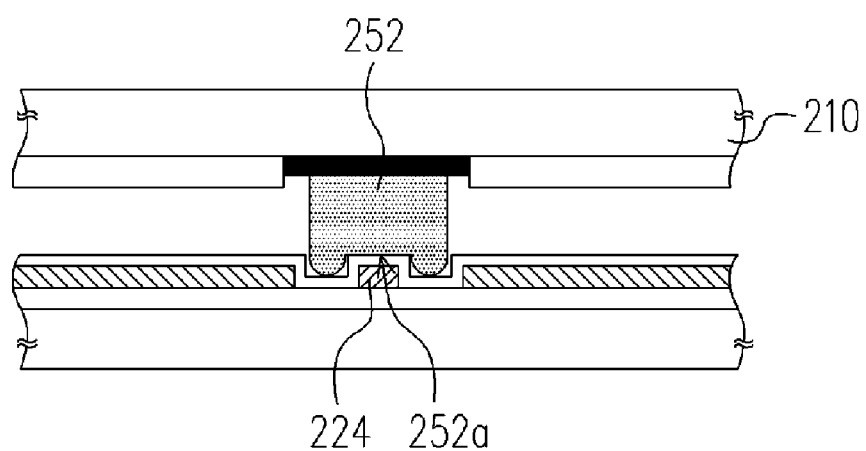
FIG. 9 is a schematic cross-sectional view showing part of a liquid crystal display pane according to one embodiment of the present invention.

Furthermore, some of the aforementioned spacers may be mutually connected to form a latching structure for providing additional strength to the assembled liquid crystal display panel. FIG. 9 is a schematic cross-sectional view showing part of a liquid crystal display pane according to one preferred embodiment of the present invention. As shown in FIG. 9, a pair of spacers 250, one on each side of a data line 224, is joined together at the base adjacent to the color filter substrate 210. Together the spacers 250 form a saddle-shaped latching structure 252. The latching structure 252 has a central recess section 252a that corresponds in position to the data line 224. The spacers in all the layouts in the aforementioned embodiments can similarly be joined to form latching structures. For example, the spacers at the corner regions of the overlapping area between the gate layer lines and the source layer lines may be joined together to form a claw-like latching structure that latches with a corresponding gate layer lines/source layer lines overlapping area.

Figure 10A:
FIGS. 10A through 10D are schematic cross-sectional views showing the steps for fabricating a color filter substrate according to an embodiment of the present invention.

FIGS. 10A through 10D are schematic cross-sectional views showing the steps for fabricating a color filter substrate according to the present invention. As shown in FIG. 10A, a glass substrate 200 is provided. A black matrix 204 is formed over the glass substrate 202 so that a plurality of openings 204a is enclosed over the glass substrate 202. The black matrix 204 is formed, for example, by coating a black photosensitive material layer (not shown) or depositing a metallic material over the glass substrate 202 in an evaporation process or sputtering process and then patterning the black photosensitive material layer or the metallic layer.

Figure 10B:
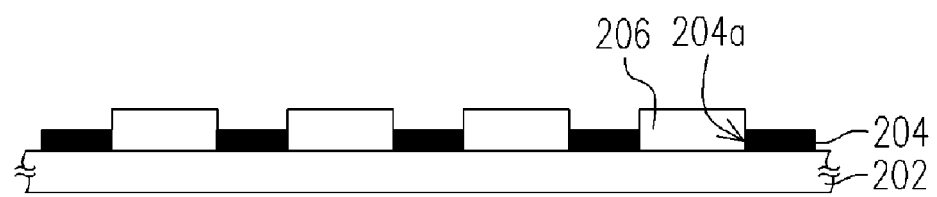

As shown in FIG. 10B, a plurality of color filtering units 206 are formed within the openings 204a. The color filtering units 206 include red filtering units, green filtering units and blue filtering units, for example. The color filtering units 206 are formed, for example, by forming color photosensitive material layers (not shown) in sequence over the glass substrate 202. Thereafter, through photo-exposure and development, color filtering units 206 of various colors are formed within the respective openings 204a.

Figure 10C:
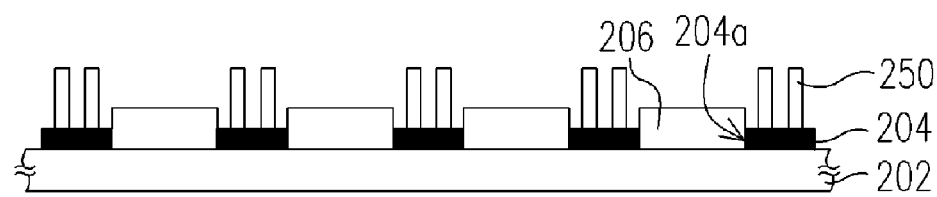

As shown in FIG. 10C, a plurality of spacers 250 are formed on the black matrix 204. The spacers 250 are positioned to lean against the edge of the scan line 222 and the data line 224 after joining the color filter substrate 210 and the thin film transistor array substrate 220 together (refer to FIG. 2). Obviously, according to the aforementioned embodiment, the spacers 250 may also be positioned in places next to structures having a step height difference on the thin film transistor array substrate 220. The spacers 250 are formed, for example, by depositing organic photosensitive material over the glass substrate 202 and patterning the organic photosensitive material layer (not shown) in a photo-exposure and a development process. It should be noted that the aforementioned latching structures are formed on the color filter substrate 202 by processing the organic photosensitive material layer (not shown) in a multiple patterning operation.

Figure 10D:
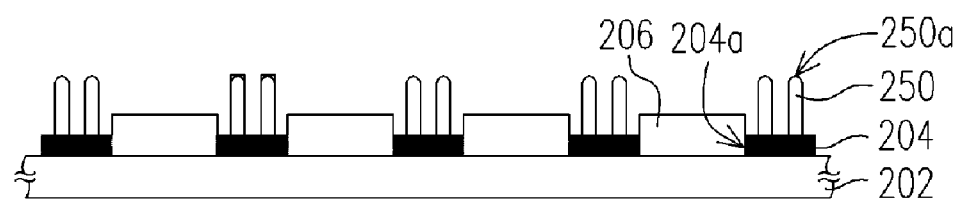

As shown in FIG. 10D, a post-baking operation may be carried out after forming the spacers 250 on the color filter substrate 202. In general, the open end of the spacers 250 (the end away from the glass substrate 202) has a smooth surface 250a. The smooth terminal surface 250a of the spacers 250 facilitates the alignment of two substrates and provides a larger tolerance for the assembly of liquid crystal display panel.

After completing the fabrication of the color filter substrate, the color filter substrate and the thin film transistor array substrate are assembled together to form a liquid crystal display panel. The spacers on the color filter substrate at least lean against one side edge of the gate layer lines or the source layer lines on the thin film transistor array substrate. Hence, aside from maintaining a constant distance of separation between the color filter substrate and the thin film transistor array substrate, the spacers also fix the position of the color filter substrate and the thin film transistor array substrate relative to each other. The spacers also strengthen the assembled liquid crystal display panel against vibrations and external forces so that the color filter substrate and the thin film transistor array substrate can hardly shift away from their assembled positions.

In summary, the present invention at least includes the following characteristics and advantages:

1. The spacers lean on structures having a step height difference above the thin film transistor array substrate after the liquid crystal display panel is assembled. This reduces the possibility of the color filter substrate and the thin film transistor array substrate from moving relative to each other due to vibration or other external forces. This ensures a higher bonding strength, reliability and display quality for the assembled liquid crystal display panel.

2. The spacers are formed on the black matrix of the color filter substrate so that the opening ratio and transparency of the liquid crystal display panel can be maintained.

3. Since the spacers lean on structures having a step height difference above the thin film transistor array substrate, the color filter substrate and the thin film transistor array substrate are easily aligned during assembly. Hence, the assembling time for each liquid crystal display panel is shortened and productivity is increased.

4. One end of the spacers has a smooth surface so that a larger tolerance during assembly is permitted. This often facilitates the process of aligning and bonding the color filter substrate and the thin film transistor array substrate together.

5. Since the spacers can be fabricated on the color filter substrate by combining with spacer on color filter (SOC) technique, no additional cost is incurred.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display panel, comprising:
    a color filter substrate;
    a thin film transistor array substrate, disposed parallel to the color filter substrate, wherein the thin film transistor array substrate has a plurality of gate layer lines and a plurality of source layer lines thereon;
    a plurality of spacers, disposed on the color filter substrate, wherein the spacers at least lean on one of the side edges of the gate layer lines or the source layer lines, and the spacers are disposed at the overlapping area between the gate layer lines and the source layer lines with the spacers leaning against both the gate layer lines and the source layer lines, wherein adjacent spacers are joined together on the color filter substrate to form a latching structure such that a central recess section of the latching structure is able to latch onto the overlapping area between the gate layer lines and the source layer lines; and
    a liquid crystal layer, disposed between the color filter substrate and the thin film transistor array substrate.

2. The liquid crystal display panel of claim 1, wherein the gate layer lines comprise scan lines and the source layer lines comprise data lines.

3. The liquid crystal display panel of claim 2, wherein the gate layer lines further comprise common lines.

4. The liquid crystal display panel of claim 1, wherein the spacers have a cylindrical or a wall-like shape.

5. A liquid crystal display panel, comprising:
    a color filter substrate;
    a thin film transistor array substrate, disposed parallel to the color filter substrate, wherein the thin film transistor array substrate has a plurality of gate layer lines and a plurality of source layer lines thereon;
    a plurality of spacers, disposed on the color filter substrate, wherein the spacers at least lean on one of the side edges of the gate layer lines or the source layer lines, and the spacers are disposed on opposite sides of the gate layer lines with the spacers leaning against the gate layer lines as well, wherein adjacent spacers are joined together on the color filter substrate to form a latching structure such that a central recess section of the latching structure is able to latch onto the gate layer lines; and
    a liquid crystal layer, disposed between the color filter substrate and the thin film transistor array substrate.

6. The liquid crystal display panel of claim 5, wherein the gate layer lines comprise scan lines and the source layer lines comprise data lines.

7. The liquid crystal display panel of claim 6, wherein the gate layer lines further comprise common lines.

8. The liquid crystal display panel of claim 5, wherein the spacers have a cylindrical or a wall-like shape.

9. A liquid crystal display panel, comprising:
    a color filter substrate;
    a thin film transistor array substrate, disposed parallel to the color filter substrate, wherein the thin film transistor array substrate has a plurality of gate layer lines and a plurality of source layer lines thereon;
    a plurality of spacers, disposed on the color filter substrate, wherein the spacers at least lean on one of the side edges of the gate layer lines or the source layer lines, and the spacers are disposed on opposite sides of the source layer lines with the spacers leaning against the source layers as well, wherein adjacent spacers are joined together on the color filter substrate to form a latching structure such that a central recess section of the latching structure is able to latch onto the source layers; and
    a liquid crystal layer, disposed between the color filter substrate and the thin film transistor array substrate.

10. The liquid crystal display panel of claim 9, wherein the gate layer lines comprise scan lines and the source layer lines comprise data lines.

11. The liquid crystal display panel of claim 10, wherein the gate layer lines further comprise common lines.

12. The liquid crystal display panel of claim 9, wherein the spacers have a cylindrical or a wall-like shape.

* * * * *